June 7, 1966     E. D. LATULIPPE     3,254,933
MOVIE CAMERA
Filed Oct. 24, 1963     2 Sheets-Sheet 1
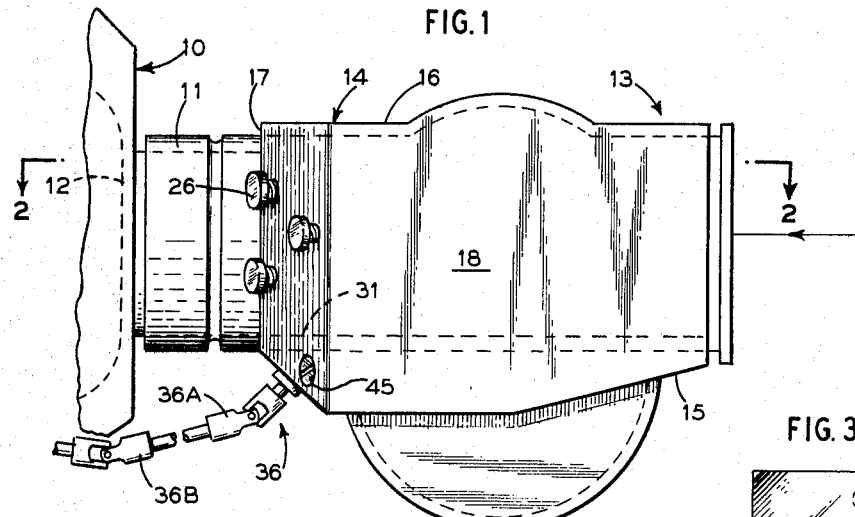
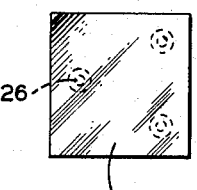
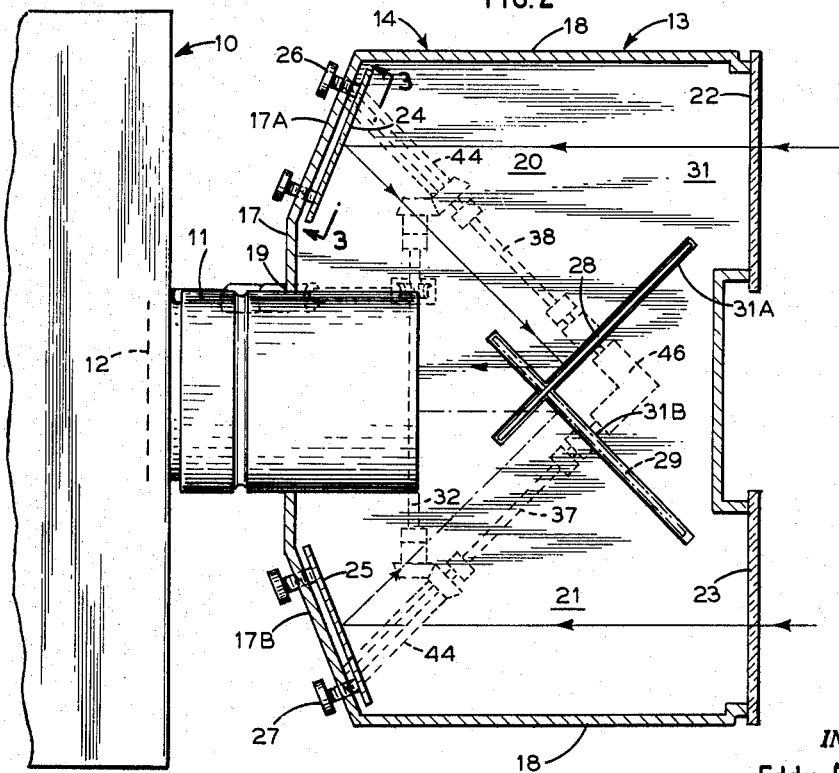
INVENTOR.
Eddy D. Latulippe
BY
ATTORNEY June 7, 1966
E. D. LATULIPPE
3,254,933
MOVIE CAMERA
Filed Oct. 24, 1963
2 Sheets-Sheet 2
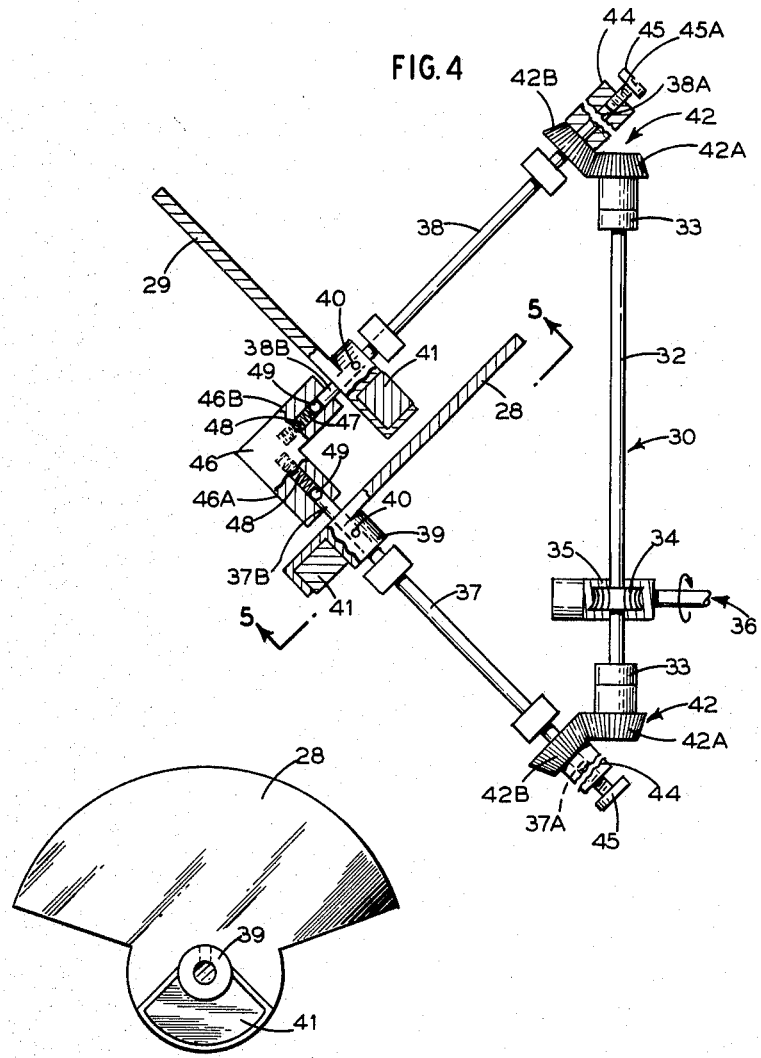
INVENTOR.
Eddy D. Latulippe
BY
ATTORNEY United States Patent Office 3,254,933
Patented June 7, 1966

3,254,933
MOVIE CAMERA
Eddy D. Latulippe, Englewood Cliffs, N.J., assignor to
E. D. L. Dimension, Inc., New York, N.Y.
Filed Oct. 24, 1963, Ser. No. 318,697
5 Claims. (Cl. 352—57)

This invention relates to a movie camera for taking stereoscopic pictures. More specifically, this invention is directed to a combination of a movie camera and an adaptor or the adaptor, per se whereby the movie camera can be readily utilized for taking pictures that will project in three dimension.

Heretofore, many efforts have been made to produce a successful movie camera capable of taking three dimensional pictures. However, the known approaches and efforts to attain a successful stereoscopic camera resulted in relatively complex structures and mechanisms which, at best, were unreliable and unsatisfactory. The known prior art constructions therefore proved to be impractical, relatively complex, very expensive to manufacture, and for this reason, uneconomically and not satisfactory.

An object of this invention is to provide a stereoscopic camera that is relatively simple in construction, can be easily fabricated, is relatively inexpensive, and is positive in operation.

Another object of this invention is to provide an adaptor which can be readily utilized to convert a movie camera for taking two dimensional pictures into a stereoscopic camera for taking three dimensional pictures with a minimum of alterations to the structure of the movie camera.

Another object is to provide in combination with a movie camera, an adaptor by which a movie camera can be readily converted with a minimum of effort and with a maximum of ease into a camera for taking either two dimensional pictures or three dimensional pictures.

Still another object is to provide a stereoscopic camera in which the three dimensional pictures can be projected onto a single film strip.

Still another object is to provide a movie stereoscopic adaptor which can be readily attached to the lens housing of a conventional movie camera so as to convert the same into a stereoscopic camera.

The foregoing objects and other features and advantages are attained by a movie camera, which in accordance with this invention, is provided with an adaptor for exposing a film such that it will, when projected, upon a screen will result in a stereoscopic effect. This is attained by a camera or adaptor therefore comprising a housing which can be readily fitted onto the lens housing of the movie camera. The housing defines a pair of spaced parallel passages which are open at one end for receiving the viewing lens to define the eyes of the camera. Operatively associated with each of the viewing lens is a static mirror for reflecting the light rays entering through the respective viewing lens toward the center of the adaptor housing. Means are provided for adjustably positioning the respective static mirrors to assist in bringing the reflective images, as viewed through the respective viewing lens into substantial coincidence onto the film. Operatively associated with each of the static mirrors is a rotating mirror. The respective rotating mirrors are arranged so as to alternately transmit the light rays received from its respective corresponding static mirror to the camera picture taking lens so that the images transmitted can be successfully exposed onto a single film strip. The arrangement is such that the rotating mirrors are timed to the shutter operation of the lens so that the mirrors alternately transmit the image as viewed through the respective eyes, whereby the alternate images are spaced on succeeding frames of the film strip.

Means are provided for rotating the respective rotating mirrors in synchronization with the film operating train of the camera. This is attained by connecting the drive means of the respective mirrors into driving relationship with the operating film train of the camera. Thus, when the camera is actuated, the respective rotating mirrors are driven in perfect synchronization with the film operating train so that the exposures of the film is timed precisely with the operation of the rotating mirrors to effect successive exposures of the film frames. Also, means are provided for effecting limited adjustment of the rotating mirrors to center the projected images onto the film strip.

A feature of this invention resides in the provision that the stereoscopic adaptor can be readily applied to a movie camera of known construction with a minimum of modification to the camera.

Another feature resides in the provision that the respective static and corresponding rotating mirrors can be readily adjusted so as to assure maximum registrations of the respective images reflected by each of the rotating mirrors onto the film strip.

Another feature of the invention resides in the provision that the drive means of the respective rotating mirrors can be readily connected to the film operating train of the movie camera so as to render the operation of the mirrors synchronous with the operation of the film train.

Another feature resides in the provision that the stereoscopic adaptor renders three dimensional pictures to be taken on and projected from a single film strip.

Other features and advantages will become more readily apparent when considered in view of the specification and drawings in which, FIGURE 1 is a side elevation view of the stereoscopic adaptor of this invention as applied to a movie camera of known construction.

FIGURE 2 is a sectional plan view taken along line 2—2 of FIG. 1.

FIGURE 3 is a detail front view of one of the static mirrors taken along line 3—3 of FIG. 2.

FIGURE 4 is a detailed plan view of the drive mechanisms for effecting rotation of the respective rotating mirrors of the instant stereoscopic adaptor.

FIGURE 5 is a detail front view of one of the rotating mirrors.

Referring to the drawings, there is shown in FIGS. 1 and 2 a fragmentary illustration of a movie camera 10 for taking two dimensional pictures, and having a lens assembly 11 with appropriate shutter arrangements for exposing a film strip 12, and the usual film operating train for operating the same, which is not shown. In accordance with this invention, there is provided a stereoscopic adaptor 13 which can be readily fitted to the lens housing 11 of the movie camera so as to convert the camera 10 for taking and exposing three dimensional pictures on the film strip 12.

As shown, the stereoscopic adaptor 13 comprises a light impervious housing 14 which is defined by a bottom wall 15, a top wall 16, a rear wall 17, and closing side walls 18. The rear wall 17 of the housing is provided with an opening 19 or other suitable means by which the housing 14 can be readily fitted or secured to the lens housing 11 of the movie camera. The arrangement of the adaptor housing 14 is such that it defines a pair of parallel passageways 20, 21 which terminate in an opening for receiving the appropriate viewing lens 22, 23. Accordingly, the respective viewing lens 22, 23 define the eyes of the stereoscopic adaptor.

As best seen in FIG. 2, the opposed end portions 17A, 17B of the rear wall 17 of the housing are inclined forwardly, preferably at an angle of approximately 22½°.

Mounted on each of the inclined end portions of the housing rear wall, which defines the end of the respective passages 20, 21 is a static mirror 24, 25 respectively disposed in alignment with the respective viewing lenses. Thus, the arrangement is such that light rays entering through each of the respective viewing lenses 22, 23 fall on the corresponding static mirror and are reflected therefrom inwardly toward the center of the housing 14.

As shown in FIGS. 2 and 3, means in the form of triangularly disposed adjusting screws 26, 27 are provided for adjustably securing the respective static mirrors 24, 25 onto its adjacent rear wall end portion. In this manner each of the static mirrors 24, 25 is rendered readily adjustable about the various axis thereof from the exterior of the housing so that by suitable adjustment of the respective adjusting screws, the reflected images from each of the mirrors may be rendered substantially coincident and assist in centering the images. Thus the static mirrors 24, 25 are arranged to provide for limited adjustment of the reflected images.

Cooperatively associated with each of the static mirrors 24, 25 is a rotating mirror means 28, 29. The respective rotating mirror means 28, 29 are disposed with respect to its corresponding static mirror 24, 25 so that the reflected image from the respective static mirrors is in turn reflected from rotating mirror means associated therewith to the camera lens whenever the rotating mirror has been rotated into its operative receiving and reflecting position. The arrangement of the reflecting mirror means 28, 29 is such that they will rotate in an out of phase relationship and thereby alternately receive and reflect the image viewed by the corresponding static mirror to the camera lens so that the images transmitted are alternately exposed on successive frames of the film strip.

FIG. 4 best illustrates the drive mechanism or means 30 by which the respective rotating mirrors 28, 29 are rotated in an out of phase relationship so that the images reflected thereby are alternately transmitted or reflected to the camera lens and exposed onto the film strip.

In the illustrated embodiment, a partition plate 31 (FIGS. 1 and 2) defines the housing 14 into an upper and lower compartment. The upper compartment defines the passages 20, 21 through which the light rays are reflected. The lower compartment is arranged to contain the drive mechanism 30 of the rotating mirrors 28, 29.

Accordingly the drive mechanism 30 includes a drive shaft 32 which is journalled between the side walls 18 of the housing 14 in suitable bearings 33. A drive gear 34 secured intermediate the ends of the drive shaft 32 is disposed into meshing relationship with a worm gear 35. The worm gear 35 in turn is coupled in driving relationship to the operating film train (not shown) of the camera through a suitable connecting drive linkage 36. In the illustrated embodiment the connecting drive linkage 36 includes a pair of universal connectors 36A, 36B so as to impart any desired change in the direction desired of the transmitted force.

Connected into driving relationship with the drive shaft 32 are a pair of angularly disposed driven shafts 37, 38. Each of the driven shafts 37, 38 has secured thereto a mirror 28, 29 fixed to rotate therewith. In the illustrated embodiment, each of the mirrors 28, 29 are preferably shaped as a segment of a circle or arc (see FIG. 5) which is provided with a bearing or hub 39 through which its connected shaft 37 or 38 extends. A set screw 40 or the like may fix the mirror 28 or 29 to its shaft, 37 or 38. To provide for smoothness of operation, the respective mirrors 28, 29 are counterbalanced by a suitable weighted means 41.

As shown, the respective driven shafts 37, 38 are connected in driving relationship with the drive shaft 32 through a complementary bevel gear train 42. Accordingly the ends of the drive shaft 32 have connected thereto a bevel gear 42A. Co-operatively associated with each of the bevel gears 42A is a bevel gear 42B keyed to one end of each of the respective driven shafts 37, 38. The arrangement is such that the bevel gears 42B keyed to the end of its respective driven shaft 37, 38 is secured by a spline so as to permit for limited relative longitudinal movement of the respective shafts 37, 38 axially thereof to effect limited longitudinal movement relative between the bevel gears 42B and shafts 37, 38 as will be hereinafter described. The ends 37A, 38A of the respective shafts 37, 38 extending through the bevel gear 42B are journalled in a suitable bearing or sleeve 44 which may be supported on the side wall 18 of the housing. As seen in FIG. 1 the outer end of the bore in the respective sleeves 44 is internally threaded for receiving an adjusting screw 45. Thus the shank 45A of the adjusting screw 45 functions as a thrust bearing for one end 37A or 38A of the respective driven shafts 37, 38. As noted in FIG. 1, the adjusting head of screw 45 extends to the exterior of the housing 14 so that longitudinal adjustment of the respective driven shafts 37, 38 may be performed from exterior of the housing.

The other end 37B, 38B of the respective driven shafts 37, 38 are each joined in the respective legs 46A, 46B of a V shaped bearing member 46. As shown, each leg 46A, 46B of the V shaped bearing member 46 is provided with a bore 47 for receiving ends 37B, 38B of the respective driven shafts 37, 38. Means in the form of a spring 48 and ball bearing 49 are disposed in the bore 47 of the respectively V shaped bearing 46 to normally bias the driven shafts journalled therein. It will thus be apparent that the respective driven shafts 37, 38 are yieldingly supported between its respective bearing journals 46 and 44. Thus by effecting rotating of the respective adjusting screws 45 one way or the other, the respective shafts 37, 38 and mirror connected thereto can be rendered longitudinally adjustable a limited extent.

As shown in FIGS. 2 and 4, the respective rotating mirrors 28, 29 are disposed with respect to their associated static mirrors 24, 25 so as to reflect the light rays received thereby normal to the picture lens of the camera. Each of the mirrors 28 and 29 are fixed to their respective driven shafts 37, 38 so as to be disposed in an out of phase relationship. Thus as noted in FIG. 4, when one rotating miror is disposed into operative receiving and reflecting position in the upper compartment with its associated static mirror, the other rotating mirror is positioned in the lower compartment where it is rendered inoperative. Therefore in order to provide clearance for the respective rotating mirrors, the upper 16 and lower 15 walls of the housing are rounded, as shown. Also it is to be noted that the partition 31 is provided with intersecting slotted openings 31A, 32A through which the respective rotating mirrors 28, 29 are rotated between operative and inoperative position. Accordingly the width of the respective slots 31A, 32B are sufficiently wide to permit for the limited necessary longitudinal adjustment of the respective mirrors 28, 29.

In the operation of the camera, the film 12 is loaded into the movie camera in the conventional manner. The stereoscopic adaptor, if not built into the camera, is then fitted to the movie lens 12 of the camera. The necessary adjustments of the respective static and its corresponding rotating mirror are then made by the manipulation of the appropriate adjusting screws 26 and 45, so that the center of each of the respective images as viewed through the respective viewing lens coincide with the center line of the camera lens. With the respective mirrors properly adjusted and the drive between the rotating mirror means and the operating film train connected, the stereoscopic camera is readied for operation.

In operation, the rotating mirrors 28, 29 being driven from the film operating train of the camera will rotate in synchronization with the operation of the camera lens and its shutter construction so that the respective images viewed through each of the viewing lenses 22, 23 are reflected in an alternate manner to the camera lens, and thereby they are exposed on successive frames of the film strip.

In the illustrated embodiment, the respective rotating mirrors 28, 29 are preferably arranged so as to rotate in 180° out of phase relationship. Therefore, when one mirror is disposed in its operative reflecting position in the mirror compartment of the adaptor housing, the other mirror is disposed below the intermediate partition plate in the lower compartment of the stereoscopic adaptor. In this manner, the images reflected from each of the viewing lens are alternately and individually exposed on the film strip in successive frames. Therefore, the film will have alternate frames exposed with images which are separately and independently viewed through the respective viewing lens of the camera. Thus when the single film strip is developed and projected onto a viewing screen the speed of the film is such that the projected images of the individual frames become inperceptible, and therefore a stereoscopic effect is had in viewing the film projection.

From the foregoing disclosure, it is readily apparent that the adaptor may be constructed either as an integral or permanent part of a movie camera, or it may be constructed simply as an adaptor which can be readily attached and detached from the lens housing of a movie camera. A suitable coupling means is all that is required for connecting the drive mechanism 30 of the stereoscopic adaptor to the operating film train of the camera in order to convert the latter to a stereoscopic camera. Therefore, it will be readily apparent that the stereoscopic construction of the instant invention can be readily utilized to convert an existing camera into a three dimensional camera, and thereby render the movie camera readily adapted for taking either two dimensional or three dimensional pictures. Further it is to be noted that the mechanism of the stereoscopic adaptor is relatively simple, and comprises a minimum of operating components. The mechanical drive assures that the operation of the rotating mirrors are rendered synchronous with the functioning of the movie camera so that the proper exposures can be alternately made onto the film strip of the camera. Further, the ease afforded for the adjustment of the static and corresponding rotating mirrors is such that harmonization and registration of the respective images is assured to provide for a clear and sharp projected image. All the adjustments are made exteriorly of the adaptor.

While the instant invention has been described with reference to a particular embodiment thereof, it will be noted that variations and modifications may be made without departing from the spirit or scope of the instant invention.

What is claimed is:

1. An adaptor for converting a movie camera into a stereoscopic movie camera comprising,
    (a) a housing adapted to be fitted to the picture taking lens of a camera,
    (b) said housing including a pair of spaced apart viewing lenses,
    (c) static mirror means operatively associated with each of said viewing lenses for reflecting the respective rays of light passing through its associated viewing lens forwardly and toward the central axis of said housing,
    (d) rotating mirror means operatively associated with each of said static mirror means for directing the light rays reflecting from its associated static mirror means to said camera picture taking lens,
    (e) said respective rotating mirrors being disposed in out of phase relationship so that the same are rendered alternately operable,
    (f) and means for rotating the respective rotating mirror means in synchronous relationship with the film operating train of the camera,
    (g) and means for independently adjusting each of said rotating mirror means axially of its axis of rotation.

2. In combination with a movie camera having a picture taking lens and a film operating train, a stereoscopic adaptor comprising,
    (a) a housing defining a pair of parallel light impervious passageways connected in open communication with one another,
    (b) a viewing lens connected in the forward end of the respective passageways to define the eyes of the adaptor,
    (c) a static mirror associated in axial alignment with each of said eye defining lens for receiving and reflecting the light rays therefrom,
    (d) means for angling each of said mirrors to reflecting the light rays received thereby inwardly toward the center of said adaptor,
    (e) means for adjusting the angular position of the respective static mirrors with respect to the path of the light rays received thereby,
    (f) a rotating mirror operatively associated with each of said static mirrors rotatably journalled within said housing,
    (g) each of said rotating mirrors being angularly disposed with its corresponding static mirror for directing the reflected light rays therefrom through the camera lens and onto the film strip,
    (h) means for rotating each of said rotating mirrors so that the light rays received therby are alternately directed to the camera lens,
    (i) means for effecting independent axial adjustment of the respective rotating mirrors with respect to their axis of rotation to center the reflected image onto the film strip,
    (j) and drive means for effecting rotation of said rotating mirrors,
    (k) and means for connecting said drive means into synchronous driving relationship with the operating film train of the camera whereby said images reflected by said rotating mirrors are alternately exposed onto successive film frames.

3. In combination,
    (a) a movie camera having a picture taking lens and a film operating train,
    (b) a stereoscopic adaptor fitted to the end of said camera picturing lens,
    (c) said adaptor including a housing defining a pair of parallel light impervious passages,
    (d) each of said passages terminating in an opening,
    (e) a viewing lens closing the openings of the respective passages to define the eyes of the stereoscopic adaptor,
    (f) means for securing the adaptor to the lens of the camera so that the longitudinal center line of the respective passage are equidistantly spaced to either side of the center line of said camera lens,
    (g) a static mirror mounted at the end of the respective passages in alignment with the viewing lens thereof,
    (h) each of said static mirrors being angled relative to its operatively associated viewing lens for reflecting the light received thereby inwardly toward the center of the adaptor,
    (i) a pair of rotating mirrors mounted within said housing,
    (j) each of said rotating mirrors being disposed with respect to one of said static mirrors for receiving the reflected light therefrom and for transmitting the same to said camera lens whereby it is exposed to the film strip of the camera,
    (k) means for rotating the respective mirrors so that they are rendered alternately operative for projecting the reflected light therefrom onto successive frames of the film strip, (l) said latter means including,
(m) a drive shaft,
(n) a pair of driven shafts operatively associated with said drive shaft, one of said rotating mirrors being fixed to one of said driven shafts to rotate therewith,
(o) means connecting the respective driven shafts into driving relationship with said drive shaft,
(p) and means for connecting said drive shaft into driving relationship with the operating film train of the camera,
(q) means for resiliently journalling the respective driven shafts,
(r) and means for effecting axial adjustment of the respective drive shafts to effect adjustment of the rotating mirrors fixed thereto.

4. In combination,
(a) a movie camera having a picture taking lens and a film operating train,
(b) a stereoscopic adaptor fitted to the end of said camera lens,
(c) said adaptor including a housing having a top, bottom and enclosing side wall portions to define a pair of parallel light impervious passages,
(d) each of said passages terminating in an opening,
(e) a viewing lens closing the openings of the respective passages to define the eyes of the stereoscopic adaptor,
(f) means for securing the adaptor to the lens of the camera so that the longitudinal center line of the respective passages are equidistantly spaced to either side of the center line of said camera lens,
(g) a partition defining said housing into an upper and lower compartment, said partition having intersecting slotted openings formed therein,
(h) static mirror mounted on the end wall of the respective passages opposite its respective viewing lens,
(i) each of said static mirrors being angled relative to its operatively associated viewing lens for reflecting the light received therefrom inwardly toward the center of the adaptor,
(j) means for adjusting the angular relationship of the respective static mirrors relative to the longitudinal axis of its respective passage,
(k) a pair of rotating mirrors mounted in said housing,
(l) each of said rotating mirrors being angled with respect to its corresponding static mirror for receiving the reflected light rays therefrom and transmitting the same to said camera lens for projecting reflected light rays onto the film strip of the camera,
(m) means for rotating the respective mirrors so that they are rendered alternately operative for projecting the reflexed light rays from the respective viewing lens alternately onto the film of the camera,
(n) said latter means including,
(o) a command drive shaft,
(p) a bevel gear connected to the respective ends of said shaft,
(q) a driving gear connected intermediate the ends of said drive shaft,
(r) means meshing with said driving gear for operatively connecting to the film drive train of said camera to said drive shaft to effect rotation of said drive shaft in synchronous relationship to said film drive train,
(s) a pair of driven shafts operatively associated with said drive shaft,
(t) a complementary bevel gear connected to the end of each of said pair of driven shafts to mesh with the corresponding bevel gears on the ends of said drive shaft,
(u) each of said rotating mirrors being fixed to one of said driven shafts,
(v) means for resiliently biasing the respective driven shafts along their respective longitudinal axis,
(w) means for adjusting the position of the respective rotating mirrors along the longitudinal axis of its respective driven shaft,
(x) said mirror being mounted onto its respective shaft in an out of phase relationship so that the respective rotating mirrors are rendered alternately operative to alternately project the light rays reflected from the respective viewing lens onto successive frames on said film strip.

5. The invention as defined in claim 4 including:
(a) means for counterbalancing the weight of the respective rotating mirrors.

References Cited by the Examiner
UNITED STATES PATENTS
1,585,129   5/1926   Smith _____ 352—65
FOREIGN PATENTS
567,826   3/1945   Great Britain.

JULIA E. COINER, *Primary Examiner.*